(No Model.)
P. CAREY.
MACHINE FOR CONSTRUCTING TWO-PLY OR THREE-PLY ROOFING.
No. 362,202. Patented May 3, 1887.
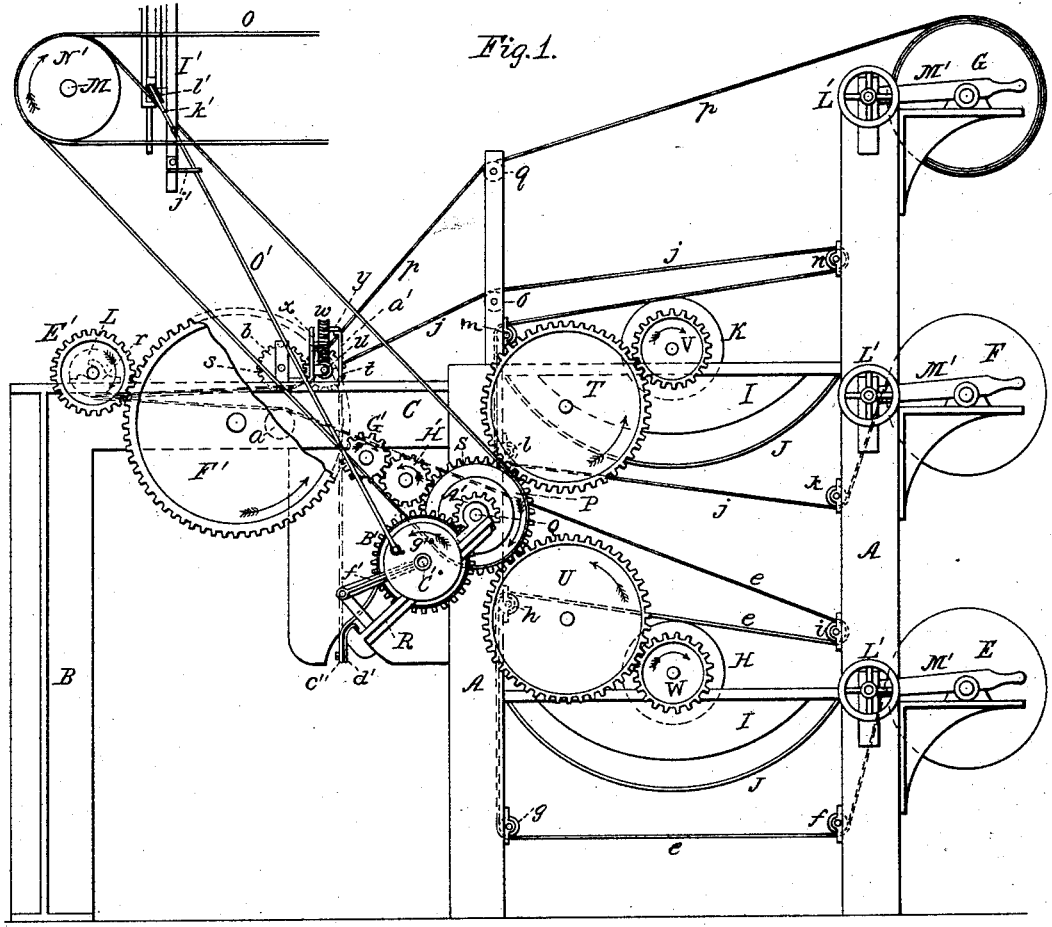
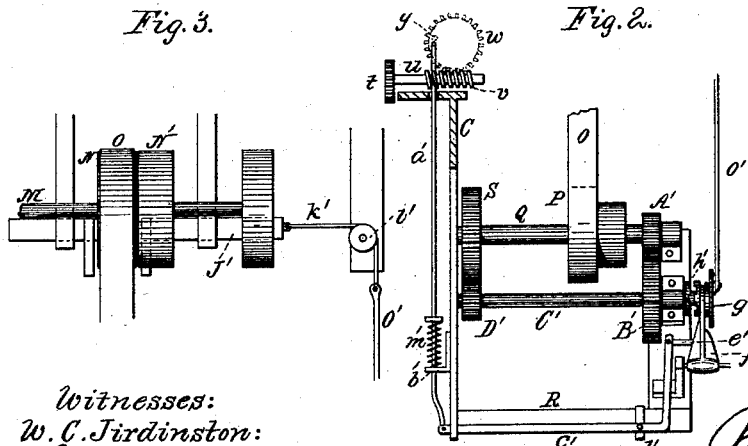
Witnesses:
W. C. Jirdinston:
Edward W. Rector
Inventor:
Philip Carey
by Stem Beck
his Attorneys.

UNITED STATES PATENT OFFICE.

PHILIP CAREY, OF CINCINNATI, OHIO.

MACHINE FOR CONSTRUCTING TWO-PLY OR THREE-PLY ROOFING.

SPECIFICATION forming part of Letters Patent No. 362,202, dated May 3, 1887.

Application filed November 6, 1886. Serial No. 218,143. (No model.)

*To all whom it may concern:*

Be it known that I, PHILIP CAREY, a citizen of the United States, residing at Cincinnati, in the county of Hamilton and State of Ohio, have invented certain new and useful Improvements in Machines for Constructing Two-Ply or Three-Ply Roofing, of which the following is a full, clear, and exact description, reference being had to the accompanying drawings, forming a part of this specification.

My invention has for its object the improved construction of machines for manufacturing two-ply or three-ply ready-made roofing of that class which is usually constructed of layers of paper, felt, or other material united together by cement or any other adhesive compound which tends to render it water-proof and fire-proof, as well as to unite the layers into a compact flexible sheet.

The novelty of my invention will be herein set forth, and specifically pointed out in the claims.

In the accompanying drawings, Figure 1 is a side elevation of my improved machine. Fig. 2 is a partial front elevation of the belt-shipping mechanism. Fig. 3 is a partial elevation of the line-shaft and belt-shipper.

The same letters of reference are used to indicate identical parts in all the figures.

In this machine the frame-work is composed of uprights A, suitably supported and braced and of any suitable material. Secured to one side of this frame-work are other uprights, B, supporting cross-bars C, thus forming a secondary frame-work secured to and made part of the main frame.

Suitably journaled in brackets D at one end of the main frame are three rolls, E, F, and G, containing the paper, felt, or other material of which it is desired to make the roofing. The material $e$ from the roll E first passes down under a spindle or guide-roller, $f$, thence across the frame under a second spindle or guide-roller, $g$, thence up over a third spindle, $h$, and thence back across the frame to a fourth spindle, $i$. In its passage from the spindle $h$ to the spindle $i$ its entire lower surface comes in contact with the top surface of a steam-heated coating-roller, H, which is revolved with its lower side partially submerged in a pan, I, secured in the frame-work and containing the cement or other adhesive material. Beneath the pan I is a second drip-pan, J, which, extending beyond the edges of the pan I, serves to catch any drippings or overflow from the pan I. The material then passes from the spindle $i$, with its coated side upward, across the frame and between two guide spindles or rollers, $a$ $b$, suitably journaled in the bars C. The material $j$ from the roll F pursues a precisely similar course to that of material $e$ over spindles $k$, $l$, $m$, $n$, and $o$ successively, and in its passage between the spindles $m$ and $n$ is passed over and in contact with a second steam-heated coating-roller, K, which revolves in a pan, I, underneath which is a pan, J, of the same construction as the pans I and J above mentioned, and for precisely the same purpose. From the spindle $o$ the material $j$ passes over the material $e$ between the rollers $a$ $b$, and with its coated side uppermost. The material $p$ passes directly from the roll G across the frame over a guide-spindle, $q$, and thence down between the rollers $a$ $b$, from which point the three layers of material $e$ $j$ $p$ proceed forward and are secured to a revolving wrapping-spindle, L, which is removably journaled in brackets $r$ upon the beam C.

M represents any line-shaft or counter-shaft, provided with tight and loose pulleys N N'. A belt, O, extends from the pulley N to a pulley, P, upon a counter-shaft, Q, suitably journaled in a frame, R, at the side of the machine. At the inner end of this counter-shaft is a pinion, S, which meshes with two larger pinions, T U, which in turn mesh with pinions V W upon the ends of the shafts of the coating-rollers H K. The shaft Q is likewise provided with a small pinion, A', at its outer end, which meshes with a pinion, B', upon a counter-shaft, C', likewise journaled in the frame R, close to and parallel with the shaft Q. Said shaft C' is likewise connected to the shaft Q by means of a pinion, D', meshing with the pinion S.

Motion is communicated to the winding-spindle L, which is provided upon one end with a pinion, E', by means of the pinions F', G', and H', the latter of which meshes with the pinion S.

The direction of the revolution of the various parts is indicated by the arrows.

While I have thus shown the machine as driven by gearing, it is evident that ordinary pulleys and belts may be substituted for the gears.

The guide spindle or roller $b$ is driven by the friction of the material passed under it and bearing against it. It has upon one end a pinion, $s$, which meshes with a pinion, $t$, upon a worm-shaft, $u$, Fig. 2, the worm $v$ of which engages with a worm-wheel, $w$, suitably journaled upon an upright, $x$. The face of the worm-wheel $w$ is provided with a pin, $y$, which at each complete revolution of said worm-wheel presses upon a rod, $a'$, extending down through the beam C and a guide, $b'$, and has its lower end pivoted to a bell-crank lever, $c'$, which, pivoted as at $d'$ to the frame R, has its upper end pivoted to a rod, $e'$, connected to a sliding arm, $f'$, whose upper extremity carries a loosely-revolving clutch-disk, $g'$, free to slide upon the end of the counter-shaft C', and to engage with a clutch, $h'$, keyed to said shaft.

A rod, O', pivoted to the disk $g'$, extends up through any suitable guide, $j'$, upon an ordinary belt-shipper frame, I'. A cord, $k'$, connected to the upper end of the arm O', extends over a pulley, $l'$, and is connected to the sliding shifter-bar J'.

It results from this construction that at every complete revolution of the worm-wheel $w$, which we say occurs, for instance, when forty feet of the material has been wound upon the winding-spindle L, the rod $a'$ is depressed, the bell-crank $c'$ vibrated, the clutch-disk $g'$ thrown into engagement with the clutch $h'$, the rod O' drawn down, the shifter-bar J' drawn over, and the belt O shifted to the loose pulley, thus automatically stopping the machine. The attendant then cuts off the material just behind the winding-spindle, removes the same, replaces another spindle, to which he connects the material in the machine, and restarts the same by shipping back the belt O upon the tight pulley by an ordinary hand-shifter. (Not here shown.)

By means of a spring, $m'$, upon the rod $a'$ the latter is reset as soon as the machine is started, and the clutch $g'$ is thrown out of engagement with the clutch $h'$.

To insure the proper overlapping of the coated material in its passage through the machine, by which I mean keeping its edges in line, provision is made for longitudinally shifting the rollers E F G, which contain the material. This can be done in a variety of ways, and I have here shown it done by means of screw hand-wheels L', which engage with arms M', connected to the ends of the roll-shafts.

If desired, adjustable scraper-blades may be placed close to the coating-rollers to regulate the thickness of the cementing material carried up by the same.

In case it is desired to make only a two-ply roofing, the roll F is dispensed with and only the materials $e$ and $p$ are run from their respective rolls E and G.

Again, any suitable brakes may be applied to the rolls E, F, and G, to prevent the too rapid unwinding of the material and to hold it in proper tension in its passage through the machine.

Having thus fully described my invention, I claim—

1. In a machine for making two-ply and three-ply roofing, the combination, with the rolls containing the material for forming the roofing, of pans containing the cement or adhesive material, steam-heated coating-rollers revolving in said pans and over which the material is passed to receive said adhesive material, a winding-spindle upon which the united layers of the roofing are wound, and automatic stop mechanism whereby, when any given amount of the roofing is wound upon the winding-spindle, the machine is brought to a stop, substantially as described.

2. In a machine for making two-ply and three-ply roofing, the combination, with the rolls containing the material for forming the roofing, of pans containing the cement or adhesive material, steam-heated coating-rollers revolving in said pans and over which the material is passed to receive said adhesive material, a winding-spindle upon which the united layers of the roofing are wound, and automatic belt-shifting mechanism whereby, when any given amount of the roofing is wound upon the winding-spindle, the main driving-belt is shifted to stop the machine, substantially as described.

3. In a machine for making two-ply and three-ply roofing, the combination and arrangement, with the pans I and steam-heated coating-rollers, of the drip-pans J, substantially as and for the purpose described.

4. In a machine for making two-ply and three-ply roofing, the combination, with the friction-spindle $b$, its pinion $s$, the pinion $t$, worm-shaft $u$, and worm $w$, provided with the stop $y$, of the rod $a'$, bell-crank $c'$, clutch-shipper $f'$, disk-clutch $g'$, clutch $h'$, rod O', cord $k'$, and the shipper bar of the belt-shipper, the parts constructed and arranged substantially in the manner and for the purpose specified.

PHILIP CAREY.

Witnesses:
 EDWARD W. RECTOR,
 GEORGE HEIDMAN.